Figure 1:
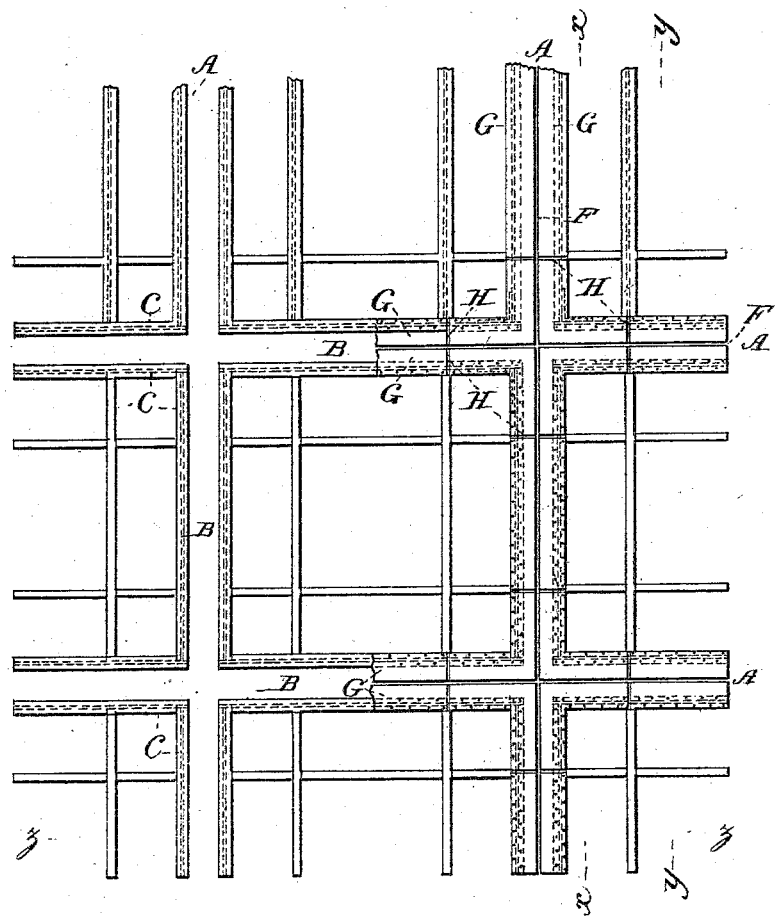

(No Model.) 2 Sheets—Sheet 1.

J. B. CASEBOLT.
CABLE RAILWAY.

No. 295,147. Patented Mar. 18, 1884.

Witnesses,
E. A. Brandau
Henry C. Lee

Inventor,
J. B. Casebolt
by F. Monteverde,
Atty.

(No Model.) 2 Sheets—Sheet 2.
J. B. CASEBOLT.
CABLE RAILWAY.
No. 295,147. Patented Mar. 18, 1884.
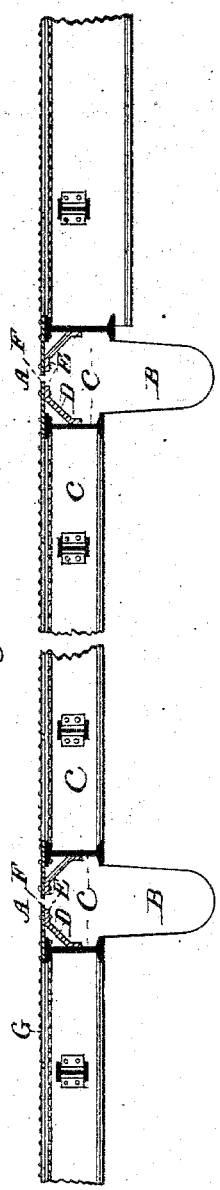
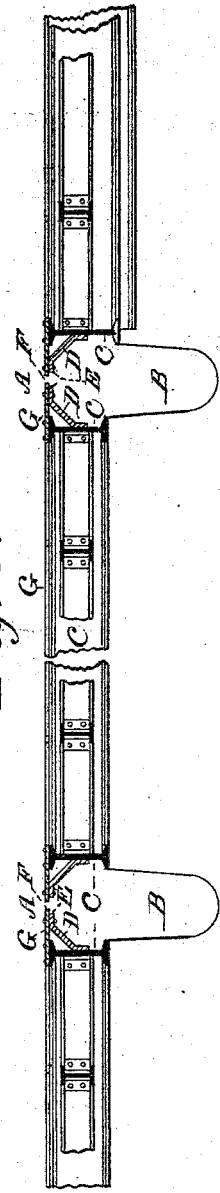
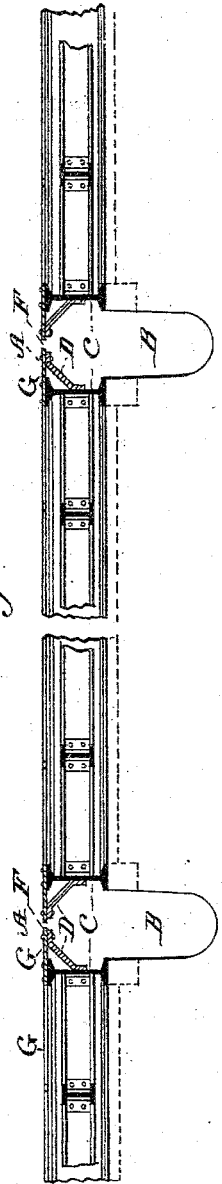

UNITED STATES PATENT OFFICE.

JOHNATHAN B. CASEBOLT, OF SAN FRANCISCO, CALIFORNIA.

CABLE RAILWAY.

SPECIFICATION forming part of Letters Patent No. 295,147, dated March 18, 1884.

Application filed June 30, 1883. (No model.)

*To all whom it may concern:*

Be it known that I, JOHNATHAN B. CASEBOLT, of San Francisco, county of San Francisco, and State of California, have invented an Improvement in Cable Railways; and I hereby declare the following to be a full, clear, and exact description thereof.

My invention relates to certain improvements in cable railways; and it consists in such a construction of the permanent way at points where two lines of railway cross each other that all the parts of both lines, including the cable tubes or tunnels, shall be united into a solid rigid structure which cannot be displaced, and in which no part can be moved independent of the other, and the track-rails can be removed without disturbing the framework.

Referring to the accompanying drawings for a more complete explanation of my invention, Figure 1 is a plan or top view of a street-crossing, showing two lines of double track crossing each other. Fig. 2 is a section taken vertically and longitudinally on line $x$ $x$, Fig. 1. Fig. 3 is a longitudinal section on $y$ $y$, Fig. 1. Fig. 4 is a longitudinal section on $z$ $z$, Fig. 1.

A A are two lines of street-railway track, which are shown in the present case crossing each other at right angles, and B B are the tubes in which the cables travel. The lower portion of these tubes may be made of concrete, or of any suitable material to keep the proper shape, and upon each side of the upper portion are the I-shaped iron beams C, which support the upper portion of the tube and plates G. Upon a line about midway of their depth angular plates D are bolted, and extend upward and toward each other until their inner flanges, E, (which are so formed as to lie horizontally,) will form a support for the plates G, the inner edges of which form the slot F, through which the grip-shank enters the tube to connect the car with the cable. At the points where the tubes cross each other these iron beams meet each other, and are securely bolted together, so as to form a rigid and immovable frame-work. Upon the tops of the beams C and the plates D are bolted iron plates G, which thus cover the tops of the tubes, and by their edges form the grip-slots, as shown. At the points where the rails of the crossing lines abut against these plates their surfaces are level with the surfaces of the plates, and shallow slots H are made across the plates into which the wheel-flanges roll, and by which they are kept in place while crossing. These plates are also bolted together, and their upper surfaces are studded with knobs or rivet-heads, which serve to prevent horses' feet from slipping upon them.

Having thus described my invention, what I claim as new, and desire to secure by Letters Patent, is—

1. In a street cable railway, the cable tube or tunnel having its upper portion composed of iron beams C, with the angular plates extending upward and inward from their sides, substantially as herein described.

2. In a street cable railway, the cable tube or tunnel composed of the flanged iron beams C and the angular plates D, in combination with the covering-plates G, substantially as herein described.

3. In a street cable railway, the cable tube or tunnel composed of the beams C and the iron plates D, with the covering-plates G, said beams and plates being united at points of intersection to form a single rigid structure, substantially as herein described.

4. In a cable railway having the cable tube or tunnel formed of beams C, angular iron plates D, and covering-plates G, the grooves or slots H, formed in these plates in line with the inside line of the rails, substantially as herein described.

In witness whereof I have hereunto set my hand.

JOHNATHAN B. CASEBOLT.

Witnesses:
F. E. MONTEVERDE,
JOHNSON REYNOLDS.